United States Patent
Nielsen

(10) Patent No.: US 11,549,528 B2
(45) Date of Patent: Jan. 10, 2023

(54) METHOD AND ARRANGEMENT TO DETECT AN OIL LEAKAGE BETWEEN SECTIONS OF A HYDRAULIC CYLINDER

(71) Applicant: Siemens Gamesa Renewable Energy A/S, Brande (DK)

(72) Inventor: Lars Holm Nielsen, Nørre Snede (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/487,637

(22) PCT Filed: Nov. 27, 2017

(86) PCT No.: PCT/EP2017/080462
§ 371 (c)(1),
(2) Date: Aug. 21, 2019

(87) PCT Pub. No.: WO2018/153524
PCT Pub. Date: Aug. 30, 2018

(65) Prior Publication Data
US 2020/0063764 A1     Feb. 27, 2020

(30) Foreign Application Priority Data
Feb. 24, 2017   (DE) ............... 10 2017 203 049.6

(51) Int. Cl.
*F03D 17/00*     (2016.01)
*F15B 20/00*     (2006.01)
*F15B 19/00*     (2006.01)

(52) U.S. Cl.
CPC ............ *F15B 19/005* (2013.01); *F03D 17/00* (2016.05); *F15B 20/005* (2013.01); *F15B 2211/7656* (2013.01)

(58) Field of Classification Search
CPC .................... F03D 17/00; F15B 20/005; F15B 2211/7656; F15B 19/005
See application file for complete search history.

(56) References Cited

U.S. PATENT DOCUMENTS 5,960,695 A * 10/1999 Aardema .............. F15B 11/006
                                                137/596.17
8,301,276 B2 * 10/2012 Tautz ........................ F15B 9/09
                                                    700/68

(Continued)

FOREIGN PATENT DOCUMENTS

EP       1812718 B1     8/2007
EP       1812718 B1     8/2008

(Continued)

OTHER PUBLICATIONS

Christoffer Sloth and Thomas Esbensen, Robust and Fault—Tolerant Linear Parameter-Varying Control of Wind Turbines, Mechatronics 21 (2011) 645-659 (Year: 2011).*

(Continued)

*Primary Examiner* — Thomas E Lazo
*Assistant Examiner* — Daniel S Collins
(74) *Attorney, Agent, or Firm* — Schmeiser, Olsen & Watts LLP

(57) ABSTRACT

Provided is an arrangement and a method to detect an oil leakage between a first section and a second section of a hydraulic cylinder. A movable piston is arranged between the first and second section in a way that the piston changes position between the sections. The change in position is done in dependency of a difference between a first force, which acts at the first section on a first cross sectional area of the piston, and a second force, which acts at the second section on a second cross sectional area of the piston. The first section comprises hydraulic oil with a predefined first pressure, while the first force is calculated based on this (Continued)

Figure 1:
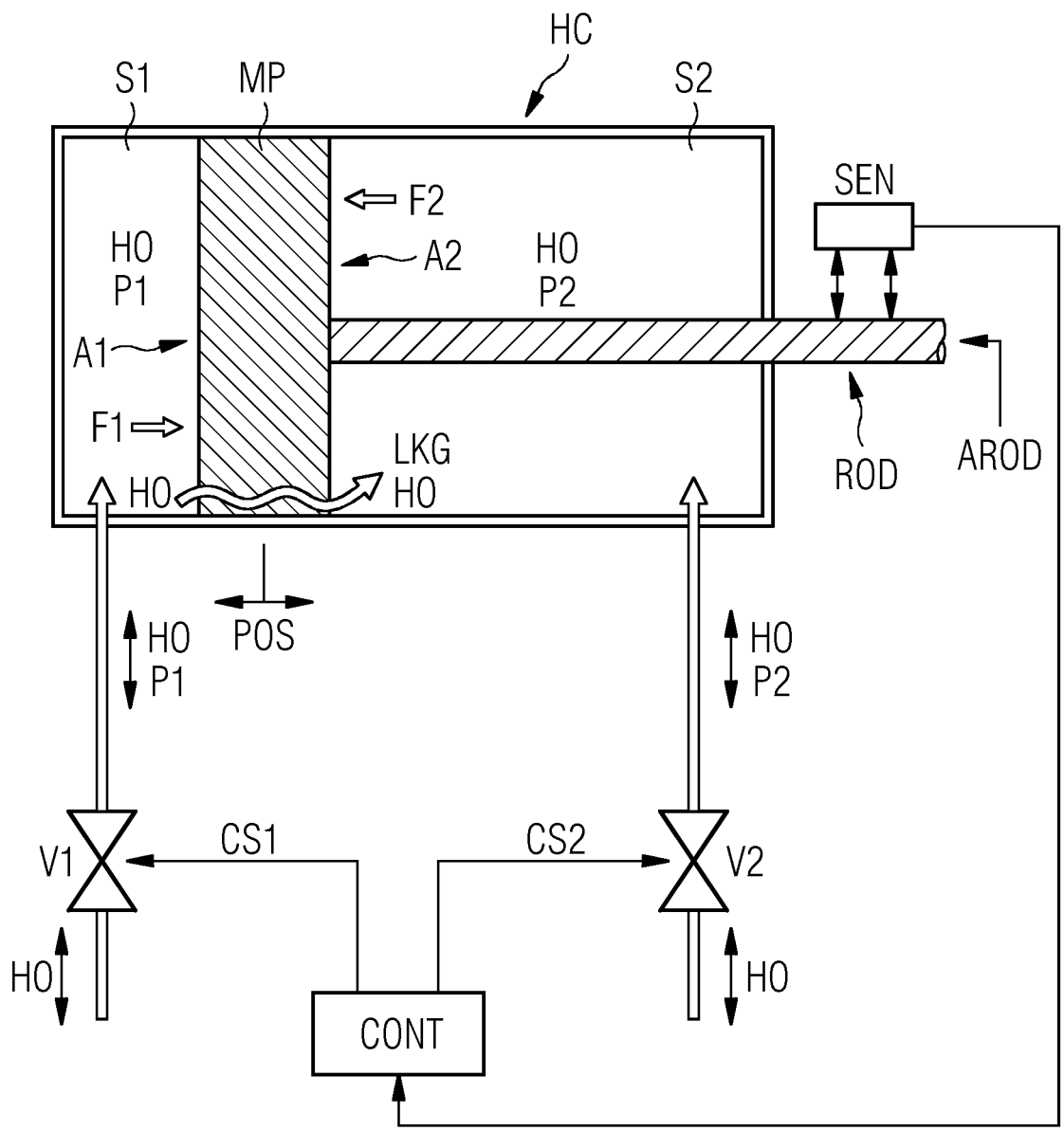

pressure and based on the first area. The second section comprises hydraulic oil with a predefined second pressure, while the second force is calculated based on this pressure and based on the second area.

7 Claims, 2 Drawing Sheets

(56) References Cited

U.S. PATENT DOCUMENTS

| | | |
|---|---|---|
| 10,344,782 B2 | 7/2019 | Penning et al. |
| 2008/0065355 A1 | 3/2008 | Bredau et al. |
| 2010/0319336 A1 | 12/2010 | Egedal et al. |
| 2013/0104991 A1 | 5/2013 | Matsui |
| 2014/0328679 A1* | 11/2014 | Nielsen ............... F03D 7/0268 416/1 |
| 2016/0341628 A1 | 11/2016 | Hervieux et al. |

FOREIGN PATENT DOCUMENTS

| | | |
|---|---|---|
| EP | 2270342 A1 | 1/2011 |
| EP | 2876301 A1 | 5/2015 |
| WO | 2013003150 A1 | 1/2013 |
| WO | WO2013/003150 A1 | 1/2013 |

OTHER PUBLICATIONS

International Search Report and Written Opinion in related PCT Application No. PCT/EP2017/080462, dated Mar. 9, 2018. 13 pages.

International Search Report & Written Opinion dated Mar. 9, 2018 for Application No. PCT/EP2017/080462.

* cited by examiner

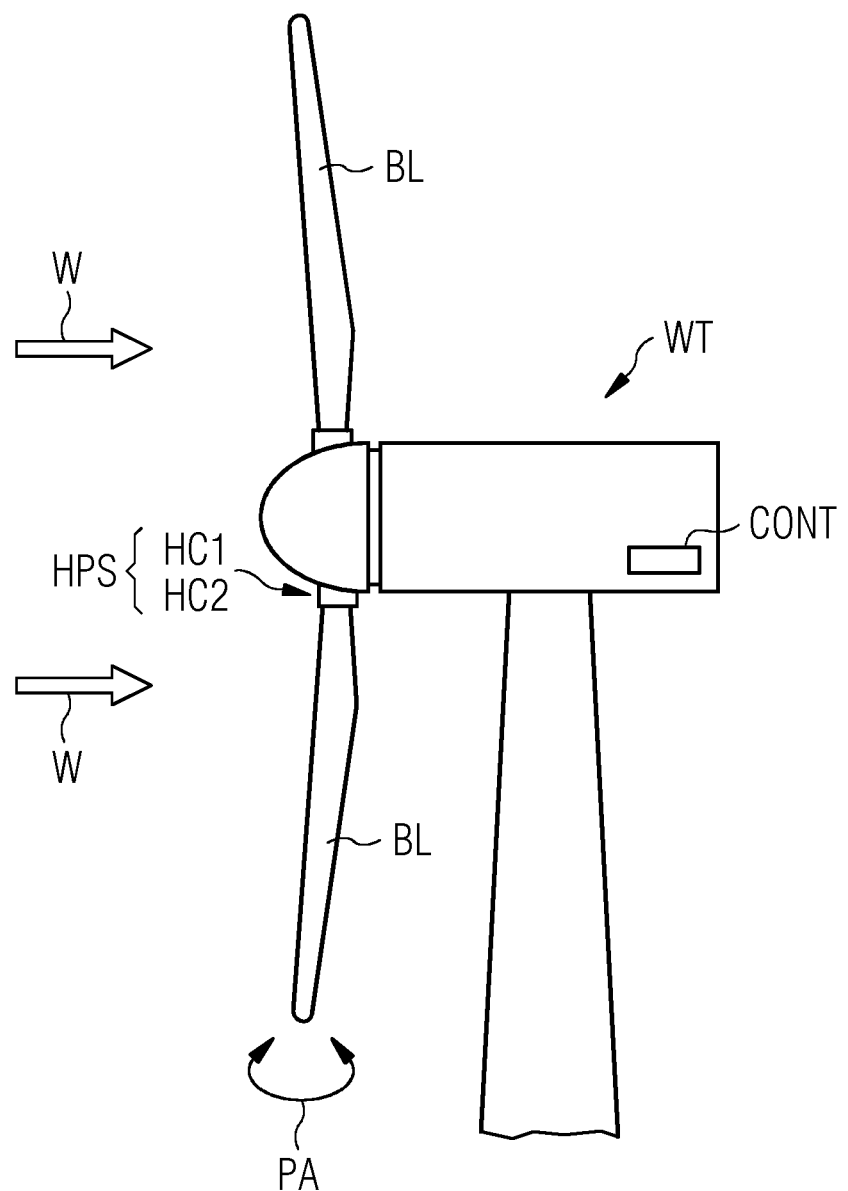

METHOD AND ARRANGEMENT TO DETECT AN OIL LEAKAGE BETWEEN SECTIONS OF A HYDRAULIC CYLINDER

CROSS-REFERENCE TO RELATED APPLICATIONS

This application claims priority to PCT Application No. PCT/EP2017/080462, having a filing date of Nov. 27, 2017, which is based on German Application No. 10 2017 203 049.6, having a filing date of Feb. 24, 2017, the entire contents both of which are hereby incorporated by reference.

FIELD OF TECHNOLOGY

The following refers to an arrangement and to a method to detect an oil leakage between a first section of a hydraulic cylinder and a second section of the hydraulic cylinder. The hydraulic cylinder is used in a hydraulic pitch drive system of a wind turbine.

BACKGROUND

Modern wind turbines are showing a number of three rotor blades, which are rotating around a horizontal axis of rotation. The rotor blades are connected with an electrical generator to convert wind energy into electrical energy.

Each rotor blade can be aligned into the incoming wind by typically two hydraulic cylinders, being part of a hydraulic pitch drive system.

Hydraulic oil is applied by pressure to each hydraulic cylinder. The hydraulic cylinder comprises a first section and a second section, while a movable piston is arranged between the first section and the second section.

Hydraulic oil is applied to these sections, creating forces, which are acting on the respective area of the piston. In example: A first force F1 is created at the first section according to this formula: $F1=P1*A1$ while P1 is the pressure at the first section and while A1 is the respective cross-sectional area of the movable piston, which is exposed to the pressure P1.

A second force F2 is created at the second section according to this formula: $F2=P2*A2$ while P2 is the pressure at the second section and while A2 is the respective cross-sectional area of the movable piston, which is exposed to pressure P2.

Based on the difference of the forces F1 and F2 the movable piston changes its relative position—it might be moved towards the second section for example if the situation is like this:

$F1>F2$ $P1*A1>P2*A2$

With A2=A1−Arod and with Arod as those cross-sectional area of a rod being part of the movable piston and reducing the respective area A2 the formula results in:

$P1*A1>P2*A1-P2*Arod.$

Thus, the movable piston will be pushed towards the second section if $P1 \geq P2$.

Based on the respective formula $F1<F2$ $P1*A1<P2*A1-P2*Arod$ the movable piston might be pushed towards the first section by choosing respective values for P1 and P2, taking into account the known cross-sectional areas A1 and Arod.

The hydraulic cylinder always comprises a high-pressure section and a low-pressure section and a respective high-pressure side and low-pressure side.

The movable piston interacts via its position change and via a root end bearing with the blade. The root end bearing is a functional part of the blade and is used to set a specific pitch angle of the blade.

In detail the rod of the movable piston is coupled with or is acting on the root end bearing.

A service report revealed that most hydraulic cylinders will fail between operation year seven and operation year eleven according to a Weibull distribution. The failure results from a leakage of hydraulic oil.

Hydraulic oil might leak externally, leaving the hydraulic cylinder and the hydraulic system itself.

Hydraulic oil even might leak inside the hydraulic cylinder, which is known as internal leakage: i.e. if there is a leakage at the movable piston hydraulic oil might be transferred between the first and the second section in an uncontrolled manner.

The internal leakage often evolves over time and results in an increased pumping and circulation of oil in the hydraulic system, which might comprise the cylinder, an oil-reservoir, oil supply connections, a pump, valves, etc.

An internal leakage cannot be detected easily as the hydraulic oil stays inside the hydraulic system and cannot be detected by checking the level of the hydraulic oil in the oil-reservoir for example.

The hydraulic system tries to compensate external oil losses by using oil, which is stored in the oil reservoir. Thus, a loss of hydraulic oil can be detected easily by service personal, checking the oil level therein.

The effects of oil leakages will increase over time and will finally result in an operational error, which is reported to a control of the wind turbine. Depending on the rank of the report signal an alarm, calling for service, might be signaled to a control center.

Each wind turbine is checked and serviced in given time periods, i.e. there might be an annual inspection. Thus, service personal might detect an external oil leakage visually as described above or the service personal might notice an (internal) oil leakage by given report signals.

Especially for offshore wind turbines, showing a guaranteed lifetime of 25 years or more, maintenance work for hydraulic components is a huge and costly problem.

It was found that such wind turbines might require in a worst-case scenario two hydraulic cylinder exchanges over the lifetime of the wind turbine. Due to the harsh offshore environment service time is restricted and limited while equipment, which is needed for the service work, might be expensive as well.

SUMMARY

An aspect relates to an improved method and arrangement to detect a leakage of a hydraulic cylinder reducing or avoiding the problems given above.

According to embodiments of the invention an oil leakage between a first section of a hydraulic cylinder and a second section of the hydraulic cylinder is detected. A movable piston is arranged between the first section and the second section in a way that the piston changes its position between the sections. The change of the position is done in dependency of a difference between a first force, which acts at the first section on a first cross sectional area of the movable piston, and a second force, which acts at the second section on a second cross sectional area of the movable piston. The first section comprises hydraulic oil with a predefined first pressure, while the first force is calculated based on this pressure and based on the first area. The second section comprises hydraulic oil with a predefined second pressure, while the second force is calculated based on this pressure and based on the second area. The first section is connected with a remote controlled first valve. This first valve is closed for the leakage detection. A sensor is coupled with the movable piston in a way that any change in its position is detected. The change of the position results from the difference of forces, which is in return resulting from the closed valve and from the alignment of the first pressure to the second pressure due to the leakage, which is between the first section and the second section. The sensor is coupled with a control, which is prepared and arranged to detect the leakage of oil based on the change of the position.

In a preferred configuration the piston interacts via its position with a blade of a wind turbine thus the blade is turned via the piston and other components to specific pitch angles.

In a preferred configuration the pitch angel is chosen between 0° and 15° for detecting a leakage of oil as these blade angles are most relevant for wear and tear of the blade.

The 0° pitch angle represents a position of the blade, wherein the blade surface, facing the wind, is essentially turned in the rotor plane as seen from a chord-wise direction. Accordingly, a 90° pitch angle refers to the "feathered position" of the rotor blade, wherein the blade surface is turned out of the wind.

In a preferred configuration the controller-software will test the cylinder for internal leakage several times a year. The aligned rotor blade pitch drive will be parked at a given testing time in one of these positions: 0°-10°-15° as described above.

In a preferred configuration the hydraulic cylinder is part of a hydraulic pitch drive system of a wind turbine.

In a preferred configuration the control is the controller (the central control unit) of the wind turbine, providing the control signals and initiating and performing the oil leakage detection automatically and in a remote-controlled manner.

Thus, all relevant surveillance signals of the whole wind turbine are combined at the wind turbine controller.

By performing this controller-based leakage detection any internal cylinder defects are detected quite early. Thus, faulty cylinders can be returned to the supplier for reimbursement as long as the respective warranty period has not lapsed.

A wind turbine often starts to report errors according to this sequence:
Report: pumping time becomes prolonged,
Report: temperature of the hydraulic oil starts to increase, and finally an
Report: an unwanted pitch tracking occurs during the wind turbine operation.

In a preferred configuration this sequence is additionally taken into account to initiate the leakage control or leakage detection. Thus, the leakage in the cylinder is detected quite early and before severe damages of the cylinder took place.

In a preferred configuration the controller-software will test the cylinder for internal leakage some times a year. The aligned rotor blade pitch drive will be parked at a given testing time in one of these positions: 0°-10°-15° as described above.

The embodiments allow a self-diagnostic procedure of the hydraulic system (hydraulic cylinder), which is done remote controlled.

The embodiments can be implemented with a cheap software package, programming the cylinder self-test on the wind turbine controller, taking into account limits of the piston movement.

Thus, all other relevant components are controlled easily by software and without the need for additional hardware and without implementation work for hardware.

Due to embodiments of the invention operational stops, which are implemented in prior art wind turbines for security reasons, and unnecessary maintenance visits can be avoided. This results in considerable cost savings especially for offshore wind turbines.

Thus, the wind turbines can be triggered to perform an oil leakage test on demand to avoid severe damages just in time.

If a production series of cylinders is known to be burdened with troubles the respective cylinders can be checked more often than usual, leading to an increased system security.

Unplanned cylinder exchanges can be avoided by an optimized and adjusted maintenance service interval.

Additionally, a more constant functionality and lubrication is achieved by embodiments of the invention, thus the overall lifetime of the cylinder is prolonged as well.

The cylinder wear depends on the site of the wind turbine thus turbulences might affect the lifetime negatively. Taking this into account as well embodiments of the invention allows a certain prediction of an exchange of a cylinder.

BRIEF DESCRIPTION

Some of the embodiments will be described in detail, with references to the following Figures, wherein like designations denote like members, wherein:

FIG. 1 shows a schematic view of an arrangement in accordance with embodiments of the present invention; and FIG. 2 shows a schematic view of a wind turbine, which is equipped with the oil leakage detection in accordance with embodiments of the present invention.

DETAILED DESCRIPTION

FIG. 1 shows the arrangement.

A hydraulic cylinder HC comprises a first section S1, while hydraulic oil HO is provided in and out of the first section S1 by a predefined first pressure P1.

The hydraulic cylinder HC even comprises a second section S2, while hydraulic oil HO is provided in and out of the second section S2 by a predefined second pressure P2.

The hydraulic cylinder HC comprises a movable piston MP, which is arranged between the first section S1 and the second section S2 in a way that the movable piston MP changes its position POS between the sections S1 and S2.

The hydraulic oil HO is applied to these sections S1 and S2 thus respective forces F1 and F2 are created.

A first force F1 is created at the first section S1 according to this formula:

$$F1 = P1 * A1.$$

P1 is the first pressure at the first section S1, which acts on a first cross sectional area A1 of the movable piston MP.

A second force F2 is created at the second section S2 according to this formula:

$$F2 = P2 * A2.$$

P2 is the second pressure at the second section S2, which acts on a second cross sectional area A2 of the movable piston MP.

For this example, the effective cross-sectional areas A1 and A2 show this dependency:

$$A2=A1-AROD$$

while AROD is the cross-sectional area of a rod ROD, being part of the movable piston MP.

The first section S1 is connected with a first valve V1, which is opened or closed remote controlled by a first control signal CS1.

The second section S2 is connected with a second valve V2, which is opened or closed remote controlled by a second control signal CS2.

A sensor SEN is coupled with the movable piston MP in a way that any change in the position POS of the movable piston MP is detected. The Sensor SEN is coupled with a control unit CONT, which is prepared and arranged to detect a leakage of hydraulic oil HO based on the change of the position POS.

Let's assume a leakage LKG between the first section S1 and the second section S2 exists, i.e. due to a faulty seal of the movable piston MP.

For the cylinder leakage test the first valve V1 is closed remote controlled by the controller CONT.

Thus, in case of a hydraulic cylinder HC without faults the pressure P1 should be somehow "frozen" in its value.

Due to the leakage LKG the first pressure and the second pressure will adapt to each other thus finally the first pressure P1 will show the same value than the second pressure P2:

$$P1=P2$$

For the respective forces this situation results in:

$$F1=P1*A1$$

$$F1=P2*A1$$

and for $$F2=P2*A2$$

$$F2=P2*(A1-AROD).$$

By comparison of the forces F1 and F2 it is shown that for a leaking LKG in the hydraulic cylinder HC:

$$F1>F2$$

as the second (active) area A2 is smaller in its value than the first (active) area A1.

Thus, the movable piston MP will change its position into the direction of the second section S2.

Summoned up if there is a leakage LKG in the cylinder HC the pressures P1 and P2 will be equate and due to the known active areas A1 and A2 the movable piston MP will change its position POS.

The change of the position POS will be detected by the sensor SEN, resulting in the knowledge that the hydraulic cylinder HC shows an internal leakage LKG.

FIG. 2 shows details of a wind turbine WT, which is equipped with the oil leakage detection according to embodiments of the invention.

The movable pistons MP (as described in FIG. 1) of i.e. two hydraulic cylinders HC1, HC2 interact with the blade BL thus the blade BL is turned into specific pitch angles PA.

For the leakage detection the pitch angel PA is chosen between 0° and 15°, thus the surface of the rotor blade BL is aligned and turned in an optimum manner into the incoming wind W.

These blade pitch angles are most relevant for wear and tear of the blade.

The hydraulic cylinders HC1, HC2 are part of a hydraulic pitch drive system HPS of the wind turbine WT.

The wind turbine control CONT is used to provide the control signals CS1, CS2 and to perform the oil leakage detection automatically.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:
1. A method comprising:
receiving an error report sequence from a wind turbine, the error report sequence including: (i) a pumping time becoming prolonged, (ii) a temperature of the hydraulic oil starting to increase, and (iii) an unwanted pitch tracking occurring during operation of the wind turbine; and
initiating a detection of an oil leakage between a first section of a hydraulic cylinder and a second section of the hydraulic cylinder in response to the receiving the error report sequence, wherein an arrangement of the wind turbine is used to detect the oil leakage, the arrangement comprising:
a movable piston arranged between the first section and the second section in a way that the movable piston changes a position between the first section and the second section dependent on a difference between a first force, which acts at the first section on a first cross sectional area of the movable piston, and a second force, which acts at the second section on a second cross sectional area of the movable piston;
wherein the first section comprises hydraulic oil with a predefined first pressure, while the first force is calculated based on the predefined first pressure and based on the first cross-sectional area, and the second section comprises hydraulic oil with a predefined second pressure, while the second force is calculated based on the predefined second pressure and based on the second cross-sectional area;
wherein the first section is connected with a remote controlled first valve, which is closed for the leakage detection;
wherein a sensor is coupled with the movable piston in a way that any change in position is detected, while a change of the position results from the difference of the first force and the second force resulting from closing the remote controlled first valve and from an alignment of the first pressure to the second pressure due to the leakage between the first section of the hydraulic cylinder the second section of the hydraulic cylinder;
wherein the sensor is coupled with a control unit, which is prepared and arranged to detect the leakage of oil based on the change of the position.

2. The method according to claim 1, wherein the sensor coupled with the movable piston is located remote from the hydraulic cylinder.

3. A wind turbine comprising:
- a plurality of rotor blades;
- a hydraulic pitch drive system for aligning a rotor blade of the plurality of rotor blades into incoming wind; and
- an arrangement for detecting an oil leakage between a first section and a second section of a hydraulic cylinder of the hydraulic pitch drive system, the arrangement comprising:
  - a movable piston of the hydraulic cylinder that interacts, via a position of the movable piston, with the rotor blade to turn the rotor blade to specific pitch angles, wherein the movable piston is arranged between the first section and the second section in a way that the movable piston changes the position between the first section and the second section dependent on a difference between a first force, which acts at the first section on a first cross sectional area of the movable piston, and a second force, which acts at the second section on a second cross sectional area of the movable piston;
  - wherein the first section comprises hydraulic oil with a predefined first pressure, while the first force is calculated based on the predefined first pressure and based on the first cross-sectional area, and the second section comprises hydraulic oil with a predefined second pressure, while the second force is calculated based on the predefined second pressure and based on the second cross-sectional area;
  - wherein the first section is connected with a remote controlled first valve, which is closed for the leakage detection;
  - wherein a sensor is coupled with the movable piston in a way that any change in position is detected, while a change of the position results from the difference of the first force and the second force resulting from closing the remote controlled first valve and from an alignment of the first pressure to the second pressure due to the leakage between the first section of the hydraulic cylinder the second section of the hydraulic cylinder;
  - wherein the sensor is coupled with a control unit, which is prepared and arranged to detect the leakage of oil based on the change of the position;
  - wherein detecting the oil leakage is initiated in response to the wind turbine reporting a sequence of errors including: (i) a pumping time becomes prolonged, (ii) a temperature of the hydraulic oil starts to increase, and (iii) an unwanted pitch tracking occurs during operation of the wind turbine.

4. The wind turbine according to claim 3, wherein the remote controlled first valve is connected with the control via a first control signal, thus hydraulic oil is provided in and out of the first section in a remote controlled manner.

5. The wind turbine according to claim 3, wherein a remote controlled second valve is connected with the control via a second control signal, thus hydraulic oil is provided in and out of the second section in a remote controlled manner.

6. The wind turbine according to claim 3, wherein the pitch angle is chosen between values, which are most relevant for wear and tear of the blade, the pitch angle being between 0° and 15° for detecting a leakage of oil.

7. The wind turbine according to claim 3, wherein the control unit is the control unit of the wind turbine, providing the control signals and performing the oil leakage detection automatically in response to the reporting of the sequence.

* * * * *